(12) United States Patent
Park (10) Patent No.: US 8,888,428 B2
(45) Date of Patent: Nov. 18, 2014

(54) INSERT NUT HAVING A DIAMOND LATTICE STRUCTURE AND METHOD FOR MANUFACTURING THEREOF

(75) Inventor: Won Sool Park, Incheon (KR)

(73) Assignee: Gen Co., Ltd. (KR)

( * ) Notice: Subject to any disclaimer, the term of this patent is extended or adjusted under 35 U.S.C. 154(b) by 0 days.

(21) Appl. No.: 13/818,424

(22) PCT Filed: Jun. 27, 2012

(86) PCT No.: PCT/KR2012/005076
§ 371 (c)(1),
(2), (4) Date: Feb. 22, 2013

(87) PCT Pub. No.: WO2013/042859
PCT Pub. Date: Mar. 28, 2013

(65) Prior Publication Data
US 2014/0186139 A1  Jul. 3, 2014

(30) Foreign Application Priority Data
Sep. 21, 2011 (KR) .......................... 10-2011-0095067

(51) Int. Cl.
*F16B 37/04* (2006.01)
*F16B 37/12* (2006.01)
*B21K 1/70* (2006.01)

(52) U.S. Cl.
CPC .............. *F16B 37/04* (2013.01); *F16B 37/122* (2013.01); *B21K 1/70* (2013.01)
USPC ............................. 411/180; 411/178; 411/179

(58) Field of Classification Search
CPC ...... F16B 37/068; F16B 37/12; F16B 37/122; F16B 37/125; F16B 37/127; B23P 19/062; B23P 19/064; B21K 1/70; B21K 1/702; B21K 1/56; B21K 1/68

USPC ............... 411/176, 178–179, 180, 188, 424; 29/DIG. 23, DIG. 32
See application file for complete search history.

(56) References Cited

U.S. PATENT DOCUMENTS

| | | | | |
|---|---|---|---|---|
| 1,227,627 | A | * | 5/1917 | Kennedy ........................ 411/178 |
| 1,603,488 | A | * | 10/1926 | Myers ....................... 29/898.056 |
| 2,380,287 | A | * | 7/1945 | Baumbach .................... 411/439 |
| 2,400,318 | A | * | 5/1946 | Rosan ............................ 411/373 |
| 3,081,808 | A | * | 3/1963 | Rosan et al. .................. 411/178 |
| 3,204,679 | A | * | 9/1965 | Walsh ............................ 411/180 |
| 3,279,519 | A | * | 10/1966 | Neuschotz .................... 411/178 |

(Continued)

FOREIGN PATENT DOCUMENTS

KR  1020110000120  1/2011

*Primary Examiner* — Roberta Delisle
(74) *Attorney, Agent, or Firm* — Cantor Colburn LLP (57) ABSTRACT

A method of manufacturing an insert nut having a diamond lattice structure comprises cutting and forging a metal rod and thus preparing a forged article having a flange and a nut body; pressing-in the forged article between a first thread rolling die formed with a first annular die protrusion and a left diagonal die protrusion for forming a left diagonal line of a diamond lattice and a second thread rolling die formed with a second annular die protrusion and a right diagonal die protrusion for forming a right diagonal line of the diamond lattice; and pressing the forged article with the thread rolling dies, and then moving up and down each of the thread rolling dies so that a plurality of diamond lattices and an annular protrusion are arranged on the external circumferential surface of the nut body.

2 Claims, 5 Drawing Sheets

(56) References Cited

U.S. PATENT DOCUMENTS

| | | | |
|---|---|---|---|
| 3,498,353 A * | 3/1970 | Barry | 411/180 |
| 3,861,462 A * | 1/1975 | McLain | 165/179 |
| 4,818,165 A * | 4/1989 | Shirai | 411/178 |
| 4,941,788 A * | 7/1990 | Highfield | 411/178 |
| 5,391,031 A * | 2/1995 | Medal | 411/82.5 |
| 5,609,351 A * | 3/1997 | Vermillion | 280/611 |
| 5,879,115 A * | 3/1999 | Medal | 411/82 |
| 5,946,991 A * | 9/1999 | Hoopman | 82/1.11 |
| 6,558,096 B2 * | 5/2003 | Kelch | 411/180 |
| 7,153,075 B2 * | 12/2006 | Sommer et al. | 411/412 |
| 7,465,136 B2 * | 12/2008 | Nagayama | 411/178 |

* cited by examiner

Fig. 1

*Prior Art*

Fig. 5 unit: kgf

|  | 1 | 2 | 3 | 4 | 5 | 6 | 7 | 8 | 9 | 10 |
|---|---|---|---|---|---|---|---|---|---|---|
| PA66-GF35 | 640 | 633 | 615 | 642 | 651 | 654 | 659 | 597 | 623 | 640 |
| PA6-GF30 | 635 | 627 | 611 | 655 | 628 | 609 | 618 | 624 | 623 | 651 |

Fig. 6 unit: kgf

|  | 1 | 2 | 3 | 4 | 5 | 6 | 7 | 8 | 9 | 10 |
|---|---|---|---|---|---|---|---|---|---|---|
| PA66-GF35 | 755 | 772 | 789 | 758 | 773 | 737 | 750 | 782 | 766 | 764 |
| PA6-GF30 | 765 | 763 | 776 | 732 | 759 | 762 | 715 | 743 | 783 | 768 |

A(Diamond lattice)

unit: kgf

|  | 1 | 2 | 3 | 4 | 5 | 6 | 7 | 8 | 9 | 10 |
|---|---|---|---|---|---|---|---|---|---|---|
| PA66-GF35 | 1032 | 1057 | 1106 | 1087 | 938 | 1005 | 1120 | 1074 | 1123 | 1092 |
| PA6-GF30 | 1022 | 1014 | 1001 | 1102 | 1049 | 1096 | 1134 | 1055 | 1067 | 1021 |

A(Diamond lattice + annular protrusion)

INSERT NUT HAVING A DIAMOND LATTICE STRUCTURE AND METHOD FOR MANUFACTURING THEREOF

BACKGROUND OF THE INVENTION

1. Field of the Invention

The present invention relates to an insert nut, and more particularly, to an insert nut having a diamond lattice structure and a manufacturing method thereof, in which a melted portion of a base material is settled on a settlement protrusion, when installing the insert nut, thereby increasing binding force between the base material and the insert nut.

2. Description of Related Art

Generally, a screw member has been widely used when assembling two members into one unit. Recently, an insert nut which is integrally injection-molded with a product is used in electronic products which are required to be thinner. For example, most mobile phone covers or bodies are formed into a two-divided case, and the insert nut is provided by press fitting or insert-injection molding in order to facilely assemble electronic parts in the case.

The insert nut is one kind of fastening mechanism for fixing one part to the other part, in which a member having a predetermined hole and formed of a resin material is fixedly installed in order to improve trouble forming a threaded hole in a body or housing, thereby allowing a screw or bolt having a predetermined diameter to be screwed.

The insert nut is injected into a hole of a housing fixed by a jig. Herein, the insert nut is heat-welded instantaneously by using high-frequency current and then bonded by a press bonding tool. In the instantaneous heat-welding, process temperature thereof is varied according to the kind of used base material in which the insert nut is installed. Typically, the insert nut is heated to a temperature of 300° C. or more and then pressed into an installation hole of the base material.

Therefore, the internal circumferential surface of the installation hole of the base material is melted by the heated insert nut and then welded among multiple protrusions formed on the external circumferential surface of the insert nut, thereby achieving the bonding between the base material and the insert nut.

In Korean Patent Laid-Open Publication No. 10-2009-0057498, there is disclosed "an insert nut and a manufacturing method thereof" in which a plurality of settlement protrusions are formed at the external surface of the insert nut so as to be provided along a screw thereof. Hereinafter, it will be described detailedly with reference to the drawings.

Figure 1:
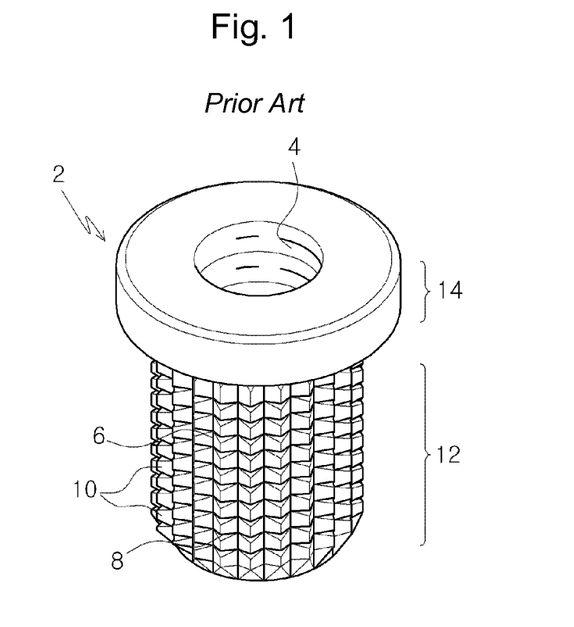
FIG. 1 is a view of a conventional insert nut having a rectangular lattice.

FIG. 1 is a view showing a conventional insert nut. As shown in FIG. 1, the insert nut 2 includes a cylindrical insertion part 12 of which an internal circumferential surface 4 is tap-processed and an external circumferential surface is formed with a plurality of settlement protrusions 10 that are formed by a plurality of horizontal and vertical grooves 6 and 8 so as to be protruded in the form of a lattice, and a flange part 14 which is integrally formed with one end of the insert part 12. Each edge portion thereof is chamfered. Especially, an front end of the insertion part 12, which is inserted into the base material, is rounded so as to be facilely inserted into the base material.

The settlement protrusions 10 are defined by the horizontal grooves 8 formed in a direction orthogonal to a length direction of the insertion part 12 and the vertical grooves 6 formed in the length direction thereof. The insertion part 12 may be inserted into or separated from the base material by a screw motion. If necessary, the horizontal grooves 8 may be substituted with a left-handed or right-handed screw. Further, the horizontal grooves 8 may be a single screw thread, a double screw thread or a triple screw thread.

The inner and outer surfaces of the flange part 14 are formed into a circular shape. However, in order to rotate the insert nut with a spanner or a wrench, the inner surface thereof may be formed with a hexagonal or polygonal groove, or the outer surface thereof may be formed into a hexagonal or polygonal shape.

Since a depth and caving angle of the vertical and horizontal grooves 6 and 8 is determined in accordance with the conventional insert nut, the description of shapes and dimensions thereof will be omitted. If the depth of the grooves 6 and 8 is large, binding force with the base material M is increased, and if the depth thereof is shallow, it is reduced.

Further, the insert nut 2 consists of the cylindrical insertion part 12 and the flange part 14 which is integrally formed with one end of the insertion part 12. Firstly, a cutting process is carried out, in which a prepared round rod is cut into a unit length, thereby forming a unit round rod. A length of the unit round rod is appropriately determined within the range that a press working can be performed. Then a punching process is performed, in which a basic outer shape and internal circumferential surface of the insert nut is formed by using a press punch.

In the punching process, the unit round rod may be formed with a complete bolt hole, and each edge portions may be chamfered. The bolt hole for forming the internal circumferential surface 4 of the insertion part may be completely formed through the precise punching process having two or more steps, or may be formed by a single punching process. Accordingly, it is possible to massively produce the insert nut which can be facilely installs in the base material.

However, in the conventional insert nut as described above, the lattice thereof is arranged in the form of a rectangle, and the grooves are formed longitudinally or transversely between the lattices. Therefore, when the insert nut is installed, the melted portion of the base material may be flowed down between the lattices, and thus the deposition efficiency between the insert nut and the base material is reduced. That is, the insert nut having the rectangular lattice can be facilely produced, but the melted portion of the base material is not deposited sufficiently between the lattices due to the arrangement of the lattices.

In practice, a pull out force of the insert nut having the rectangular lattice, which is being used currently, is about 600~650 kgf, and thus it is necessary to increase the pull out force in order to satisfy the international standard specification.

The applicant tested the pull out force of the conventional insert nut having the rectangular lattice, and a typical injection material for a vehicle, such as PA66-GF35 and PA6-GF30, was used as the base material. The testing result is shown in FIG. 5.

Figure 5:
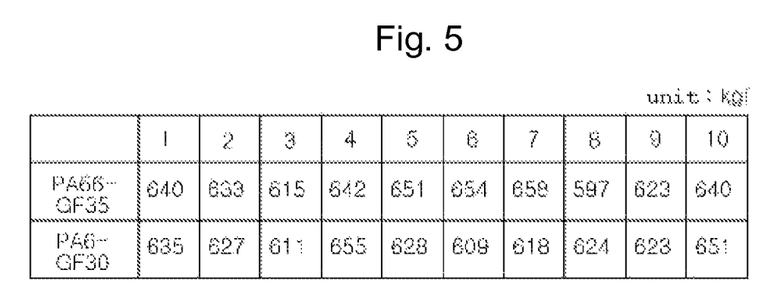
FIG. 5 is data showing the pull out force of the insert nut having the structure of FIG. 1.

As shown in FIG. 5, a unit of the pull out force is kgf, and an ultrasonic heating temperature with respect to the insert nut is 300~350° C. As shown in the drawing, the average pull out force of the base material formed of PA66-GF35 is 634 kgf, and the average pull out force of PA6-GF30 is 628.1 kgf. As shown in the result, the pull out force of the insert nut having the rectangular lattice is included within the range of the Korean standard specification, but inferior to the international standard specification for overseas export market.

SUMMARY OF THE INVENTION

An embodiment of the present invention is directed to providing an insert nut having a diamond lattice structure and a manufacturing method thereof, in which the lattice structure is formed into a diamond shape and the lattices are arranged alternately, such that, when the ultrasonic heated insert nut is inserted into a base material, the flow of the melted portion of the base material is relieved by the lattice arrangement and a large amount of the melted portion is deposited among the lattices, thereby increasing the pull out force of the insert nut.

Another embodiment of the present invention is directed to providing an insert nut having a diamond lattice structure and a manufacturing method thereof, in which the lattice surface of the insert nut is formed to be curved so that, when the ultrasonic heated insert nut is inserted into the base material, the flow of the melted portion of the base material is relieved and thus a large amount of the melted portion is deposited among the lattices.

To achieve the object of the present invention, the present invention provides an insert nut having a diamond lattice structure, wherein the nut body is formed right and left diagonal grooves formed by a thread rolling process so as to be spaced apart from each other at regular intervals, thereby forming the diamond lattice structure, and the right and left diagonal grooves are formed to be spaced apart at a distance of 1.0 mm to 1.5 mm, and each groove has a thickness of 0.4 mm to 0.5 mm.

Further, the present invention provides method of manufacturing the insert nut having the diamond lattice structure, comprising cutting and forging a metal rod and thus preparing a forged article having a flange and a nut body; pressing-in the forged article between a first thread rolling die formed with a left diagonal die protrusion for forming a left diagonal line of a diamond lattice and a second thread rolling die formed with a right diagonal die protrusion for forming a right diagonal line of the diamond lattice; and pressing the forged article with the thread rolling dies, and then moving up and down each of the thread rolling dies so that a plurality of diamond lattices are arranged on the external circumferential surface of the nut body.

Further, the present invention provides method of manufacturing the insert nut having the diamond lattice structure, comprising cutting and forging a metal rod and thus preparing a forged article having a flange and a nut body; pressing-in the forged article between a first thread rolling die formed with a first annular die protrusion and a left diagonal die protrusion for forming a left diagonal line of a diamond lattice and a second thread rolling die formed with a second annular die protrusion and a right diagonal die protrusion for forming a right diagonal line of the diamond lattice; and pressing the forged article with the thread rolling dies, and then moving up and down each of the thread rolling dies so that a plurality of diamond lattices and an annular protrusion are arranged on the external circumferential surface of the nut body.

DESCRIPTION OF SPECIFIC EMBODIMENTS

The advantages, features and aspects of the invention will become apparent from the following description of the embodiments with reference to the accompanying drawings, which is set forth hereinafter.

Figure 2:
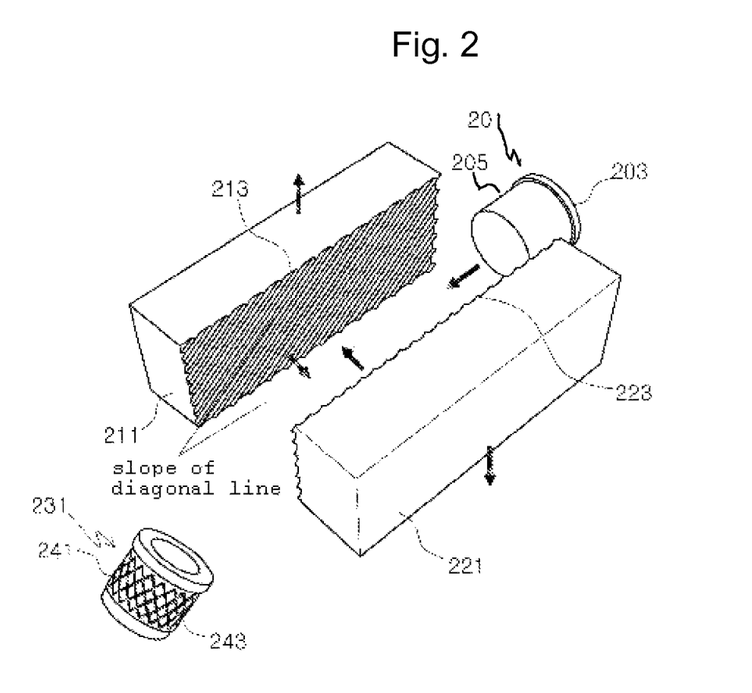
FIG. 2 is a view showing a manufacturing process of an insert nut according to the present invention.

FIG. 2 is a view showing a manufacturing process of an insert nut 231 according to the present invention. As shown in FIG. 2, a metal rod is cut and forged so as to prepare a forged article 201 having a flange 203 and a nut body 205. And the forged article 201 is pressed in between a first thread rolling die 211 formed with a left diagonal die protrusion 213 for forming a left diagonal line of a diamond lattice and a second thread rolling die 221 formed with a right diagonal die protrusion 213 for forming a right diagonal line of the diamond lattice. Then, the first and second thread rolling dies 211 and 221 are pressed up and down so that a plurality of diamond lattices are arranged on the external circumferential surface of the nut body 205.

The left and right diagonal lines which are inclined in a length direction of the insert nut 231 have a slope of 40° to 60°, preferably 45° with respect to the length direction of the insert nut 231. If the slope is less than 40°, an angle of the left and right diagonal lines of the diamond lattice is too small, and the melted portion of the base material cannot be deposited stably therebetween. Further, if the slope is more than 60°, the lattice has a small size, and a deposition surface area of the melted portion becomes smaller, and thus the pull out force is reduced.

In other words, if the slope is more than 60°, the size of the diamond lattice becomes small, and thus the shape of the lattice may be deformed, thereby forming defective products. Further, in order to solve the problem, it is necessary to widen the space between the diamond lattices and keep the size of the diamond lattice. However, in this case, the number of lattices formed on the external circumferential surface of the nut body 205 is reduced, and thus the pull out force is lowered.

In the present invention, in order to form as many lattice as possible on the nut body 205, a space between the die protrusions is set to 1.0 mm to 1.5 mm, preferably 1.25 mm, and an end of the die protrusion has a width of 0.4 mm to 0.6 mm, preferably 0.55. This is a minimum size which can perform a molding process while maintaining durability thereof. If the diamond lattice is formed as described above, a vertical groove having the same direction as the length of the insert nut 231 is excluded by the right and left diagonal lines 241 and 243. This prevents the melted portion of the base material from being flowed down, but allows the melted portion to be deposited among the plurality of diamond lattices, thereby increasing the pull out force.

For example, in case of an insert nut 231 having a rectangular lattice, the melted portion may be not deposited at the side surface of the lattice. However, in the diamond lattice, a deposition surface area of the melted portion is increased, thereby improving binding force with the base material.

Meanwhile, during the thread rolling process, the first and second thread rolling dies 211 and 221 are pressed on the external circumferential surface of the nut body 205 and then moved up and down, thereby forming the diamond lattice on the external circumferential surface of the nut body 205. Alternatively, while the forged article 201 is pressed by the first and second thread rolling dies 211 and 221, the thread rolling process may be performed by rotating and pressing-in the forged article 201. But in this case, since frictional force between the forged article 201 and each of the thread rolling dies, a system load is increased. This is associated with stability of the system, and also a large scaled thread rolling system may be required as occasion demands.

However, in the present invention, when the thread rolling process is performed by pressing the thread rolling dies while the forged article 201 is fixed, the forged article 201 is automatically rotated in a predetermined direction so as to form the left and right diagonal lines. Therefore, only the pressing force of the thread rolling dies is applied to the forged article 201 without any frictional force. Thus, the thread rolling process of the present invention can reduce the system load and also can improve the productivity.

Figure 6:
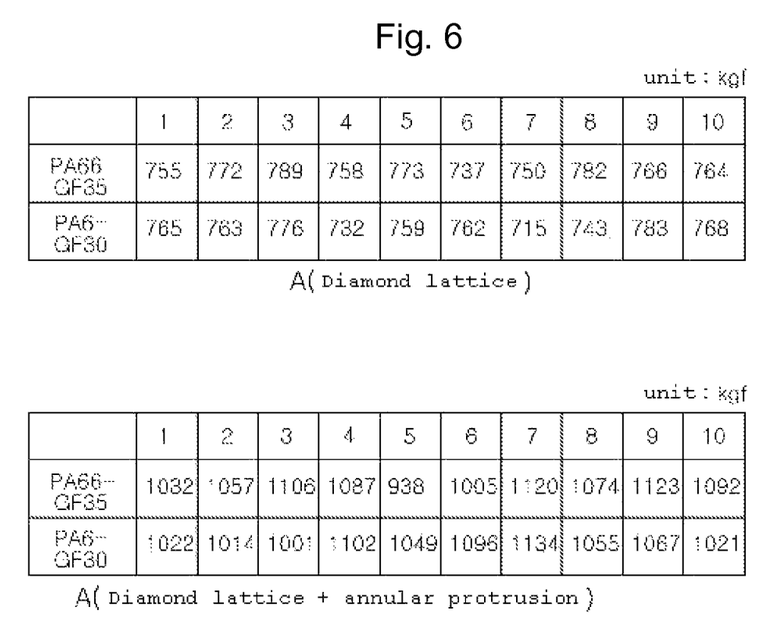
FIG. 6 is data showing the pull out force of the insert nut having a diamond structure according to the present invention.

The applicant tested the pull out force of the insert nut having the diamond lattice structure, and the typical injection material for a vehicle, such as PA66-GF35 and PA6-GF30, was used as the base material. Further, in order to equally compare with the conventional insert nut, the testing sample has the same shape as the conventional one. The testing result is shown in FIG. 6a.

Herein, a unit of the pull out force is kgf, and an ultrasonic heating temperature with respect to the insert nut is 300~350° C. in the same manner as the conventional one. The test was carried out ten times. The average pull out force of the base material formed of PA66-GF35 was 763.6 kgf, and the average pull out force of PA6-GF30 was 756.6 kgf. Therefore, when comparing with the conventional inset nut having the rectangular lattice, the pull out force of each insert nut having the diamond lattice is increased by 20.4%, respectively.

Meanwhile, in the present invention, the melted portion of the base material can be facilely deposited by using the diamond lattice. And in order to further increase the deposition efficiency, an annular protrusion is formed at the lower end of the nut body 205. That is, since the annular protrusion is formed at the lower end of the nut body 205, it is prevented that the melted portion of the base material is discharged downwardly, and thus the deposition efficiency of the base material between the diamond lattices is increased. In other words, the deposition efficiency of the base material between the diamond lattices is improved by reducing a time while the melted portion of the base material is discharged downwardly, and thus the binding force between the base material and the insert nut is increased.

Figure 3:
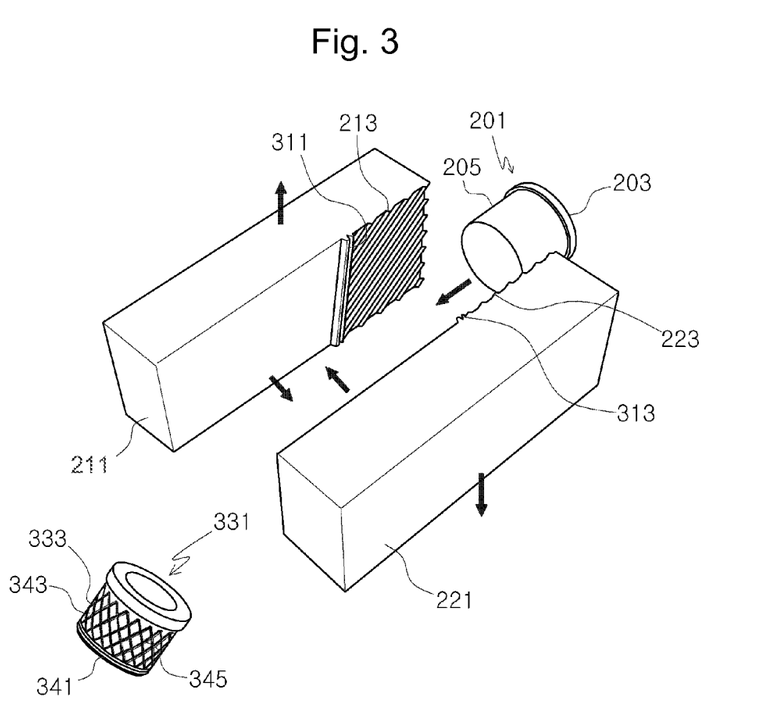
FIG. 3 is a view showing a manufacturing process of an insert nut according to another embodiment of the present invention.

FIG. 3 is a view showing a manufacturing process of an insert nut according to another embodiment of the present invention, wherein the same construction elements are designated by the same reference numerals as in FIG. 2.

As shown in the drawing, a metal rod is cut and forged so as to prepare a forged article 201 having a flange 203 and a nut body 205. And the forged article 201 is pressed in between a first thread rolling die 211 formed with a first annular die protrusion 311 and a left diagonal die protrusion 213 for forming a left diagonal line of a diamond lattice and a second thread rolling die 221 formed with a second annular die protrusion 313 and a right diagonal die protrusion 213 for forming a right diagonal line of the diamond lattice. Then, the first and second thread rolling dies 211 and 221 are pressed up and down so that a plurality of diamond lattices are formed on the external circumferential surface of the nut body 205 and an annular protrusion 341 is formed at the lower end of the external circumferential surface of the nut body 205.

The first and second annular die protrusions 311 and 313 are formed at the lower end of a molded insert nut article 331 in a vertical direction of the thread rolling dies 211 and 221, i.e., formed horizontally with respect to a front face of the lower end. Further, the first and second annular die protrusions 311 and 313 are designed to be larger than the left and right diagonal die protrusions 213 and 223, thereby increasing a valley between the annular protrusions 341. The reason of increasing the valley between the annular protrusions 341 is to allow the melted portion of the base material to be sufficiently flowed in and deposited therein.

The molded insert nut article 331 formed in the forging and thread rolling process is formed with the annular protrusion 341 as well as the diamond lattice 333 defined by right and left diagonal grooves 343 and 345. The annular protrusion 341 is formed at the lower end of the diamond lattice 333, and thus it is restrained that the melted portion of the base material which is introduced between the diamond lattices 333 is discharged to the lower side of the insert nut.

It is preferable that at least two annular protrusions 341 are provided so that the melted portion of the base material can be sufficiently deposited by the valley formed between the annular protrusions 341, thereby increasing the pull out force. Moreover, the annular protrusion 341 is formed to have the same height as or to be higher than the external circumferential surface of the diamond lattice 333. Thus, when the melted portion of the base material is pressed in between the diamond lattices 333, it can be restrained that the melted portion of the base material is discharged downwardly. However, if the annular protrusion 341 has a larger diameter than the flange 203, a diameter of a hole formed in the base material during the pressing-in of the insert nut becomes larger, and thus the binding force between the base material and the insert nut is lowered. Therefore, the annular protrusion 341 should have a diameter equal to or larger than the nut body 205 and also less than the flange 203.

Furthermore, in the embodiment, the left and right diagonal lines which are inclined in a length direction of the insert nut have a slope of 40° to 60°, preferably 45° with respect to the length direction of the insert nut. If the slope is less than 40°, an angle of the left and right diagonal lines of the diamond lattice is too small, and the melted portion of the base material cannot be deposited stably therebetween. Further, if the slope is more than 60°, the lattice has a small size, and a deposition surface area of the melted portion becomes smaller, and thus the pull out force is reduced.

Meanwhile, when the molded insert nut article 331 is prepared by the forging and thread rolling process, a tapping process for forming a screw line in the flange 203 is performed. Therefore, the nut body 205 of the insert nut is formed with the plurality of uniform diamond lattices, and at least two annular protrusions 341 are formed at the lower side of the diamond lattice.

Figure 4:
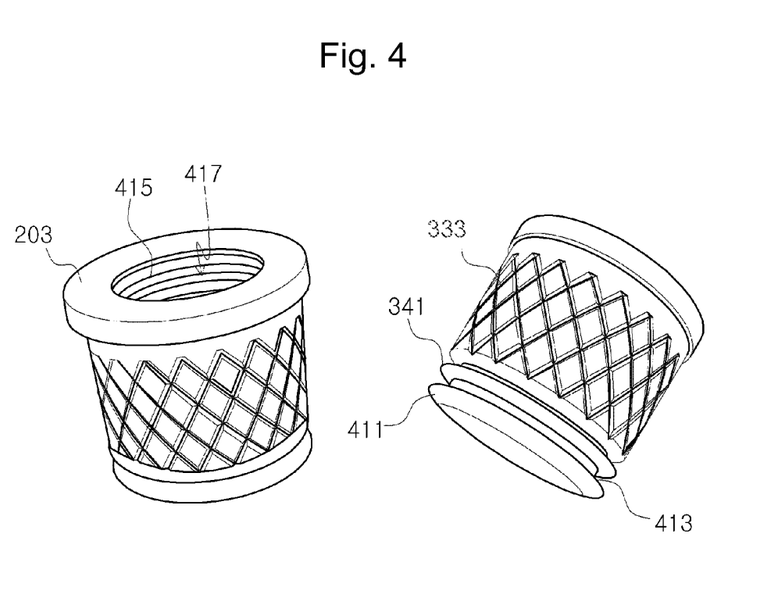
FIG. 4 is a perspective view of the insert nut manufactured by the process of FIG. 3.

FIG. 4 is a perspective view of the insert nut according to the embodiment of the present invention.

As shown in FIG. 4, the plurality of diamond lattices are formed at the lower end of the flange 203, and the annular protrusions 341 are formed at the lower side of the diamond lattice. A bolt insertion hole 417 is formed in the insert nut, and a screw portion 415 is formed at the internal circumferential surface of the bolt insertion hole 417. The annular protrusion 341 is provided in at least two or more, and the valley 413 is formed between the annular protrusions 341. The annular protrusion formed at the lowermost end forms a curvature end 411.

The reason why the end 411 is formed into the curvature shape is to allow the melted portion of the base material to be embedded in the valley 413 during the pressing-in process of the insert nut. In other words, the curvature of the end 411 is a structural means which allows the melted portion of the base material heated by ultrasonic heating to be introduced along the curvature of the end 411 into the valley 413.

Therefore, the insert nut according to the embodiment of the present invention increases the deposition surface area with the base material using the plurality of diamond lattices 333 and the annular protrusion 341, thereby considerably increasing the pull out force.

As a result of the test with respect to the insert nut having the diamond lattice formed with the annular protrusion 341, it is confirmed that the pull out force is remarkably increased, thereby improving the specification of the insert nut. The testing result is as follows: the typical injection material for a vehicle, such as PA66-GF35 and PA6-GF30, was used as the base material, and in order to equally compare with the conventional insert nut, the testing sample has the same shape as the conventional one. The testing result is shown in FIG. 6b.

Herein, a unit of the pull out force is kgf, and an ultrasonic heating temperature with respect to the insert nut is 300~350° C. in the same manner as the conventional one. The test was carried out ten times. The average pull out force of the base material formed of PA66-GF35 was 1067.9 kgf, and the average pull out force of PA6-GF30 was 1056.1 kgf. Therefore, when comparing with the conventional inset nut having the rectangular lattice, the pull out force of each insert nut having the diamond lattice is increased by 68.4% and 68.1%, respectively.

According to the insert nut having the diamond lattice structure and the manufacturing method thereof, as described above, the diamond lattice structure is formed by the thread rolling process so that the lattices are arranged alternately, and thus when the ultrasonic heated insert nut is inserted into the base material, the flow of the melted portion of the base material is relieved by the lattice arrangement and a large amount of the melted portion is deposited among the lattices, thereby increasing the pull out force of the insert nut. Further, according to the present invention, the protrusion of the insert nut is formed into the diamond shape, and at least two annular protrusions are formed at the lower side of the diamond lattice by the thread rolling process, and thus the flow of the melted portion of the base material is further restrained by the annular protrusions as well as the lattice structure and arrangement, thereby further increasing the pull out force of the insert nut.

While the present invention has been described with respect to the specific embodiments, it will be apparent to those skilled in the art that various changes and modifications may be made without departing from the spirit and scope of the invention as defined in the following claims.

What is claimed is:

1. An insert nut having a diamond lattice structure, comprising a flange and a nut body,
wherein the nut body is formed right and left diagonal grooves formed by a thread rolling process so as to be spaced apart from each other at regular intervals, thereby forming the diamond lattice structure, and the right and left diagonal grooves are formed to be spaced apart at a distance of 1.0 mm to 1.5 mm, and each groove has a thickness of 0.4 mm to 0.5 mm,
wherein at least two or more annular protrusions are formed at the lower side of the right and left diagonal grooves by a thread rolling process, and the annular protrusion formed at the lowermost side has a curvature end.

2. The insert nut of claim 1, wherein each diagonal line forming the right and left diagonal grooves are inclined in a length direction of the insert nut and has a slope of 40° to 60°.

* * * * *